United States Patent [19]

Chung

[11] Patent Number: 5,764,895
[45] Date of Patent: Jun. 9, 1998

[54] METHOD AND APPARATUS FOR DIRECTING DATA PACKETS IN A LOCAL AREA NETWORK DEVICE HAVING A PLURALITY OF PORTS INTERCONNECTED BY A HIGH-SPEED COMMUNICATION BUS

[75] Inventor: David H. Chung, Sunnyvale, Calif.

[73] Assignees: Sony Corporation, Tokyo, Japan; Sony Electronics, Inc., Park Ridge, N.J.

[21] Appl. No.: 590,125

[22] Filed: Jan. 23, 1996

Related U.S. Application Data

[63] Continuation-in-part of Ser. No. 371,499, Jan. 11, 1995.
[51] Int. Cl.$^6$ .................................................. H04Q 11/00
[52] U.S. Cl. .................... 395/700.8; 370/60; 370/61; 370/94.1
[58] Field of Search ............................ 370/62, 854, 94, 370/800, 60, 61, 94.1; 395/200.8

[56] References Cited

U.S. PATENT DOCUMENTS

| | | | |
|---|---|---|---|
| H586 | 2/1989 | Kun | 370/94 |
| Re. 33,426 | 11/1990 | Sugimoto et al. | 370/85.14 |
| 4,213,201 | 7/1980 | Gagnier et al. | 370/62 |
| 4,589,120 | 5/1986 | Mendala | 375/117 |
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85 |
| 4,715,030 | 12/1987 | Koch et al. | 370/85 |
| 4,718,060 | 1/1988 | Oguchi et al. | 370/85 |
| 4,723,211 | 2/1988 | Moustakas et al. | 455/612 |
| 4,727,537 | 2/1988 | Nichols | 370/85 |
| 4,727,538 | 2/1988 | Furchtgott et al. | 370/85 |
| 4,737,953 | 4/1988 | Koch et al. | 370/94 |
| 4,744,078 | 5/1988 | Kowalcyzk | 370/85 |
| 4,797,879 | 1/1989 | Habbab et al. | 370/3 |
| 4,823,338 | 4/1989 | Chan et al. | 370/85 |
| 4,849,961 | 7/1989 | Morimoto et al. | 370/29 |
| 4,878,216 | 10/1989 | Yunoki | 370/60 |
| 4,901,308 | 2/1990 | Deschaine | 370/58.1 |
| 4,905,219 | 2/1990 | Barr et al. | 370/4 |
| 4,933,937 | 6/1990 | Konishi | 370/85.13 |

(List continued on next page.)

FOREIGN PATENT DOCUMENTS 0642246  8/1994  European Pat. Off.

OTHER PUBLICATIONS

National Semiconductor, databook, "DP83934 SONIC™-T Systems-Oriented Network Interface Controller with Twisted Pair Interface".

William Stallings, "Internetworking: A Guide for the Perplexed," Telecommunications, North American Edition, Sep. 1989, pp. 25-30.

Bob Stewart and Bill Haw, "Local Area Network Applications," Telecommunications, North American Edition, Sep. 1984, pp. 96f-96j, and 96 u.

Bob Stewart, Bill Hawe, and Alan Kirby, "Local Area Network Connection," Telecommunications, North American Edition, Sep. 1994, pp. 54-55,58-59 and 66.

*Primary Examiner*—Krisna Lim
*Attorney, Agent, or Firm*—Haverstock & Owens LLP

[57] ABSTRACT

A one-chip local area network (LAN) device comprises more than one local area network interface ports each including one receiver (11–14), one transmitter (15–18) and one triplet processor (25–28), a high-speed data bus (24) to which individual ones of the plurality of local area network interface ports are connected, and a switch engine (34) connected to the high-speed data bus (24) and including a packet buffer controller (40), a high-speed data bus controller (42) and content-addressable memory manager (44). Each triplet processor (25–28), provides for the reading of a destination address in packets received from a corresponding one of the local area network interface ports and simultaneously provides for the cut-through transmission of packets received from other ones of the local area network interface ports that transfer the packets over the high-speed data bus (24).

13 Claims, 8 Drawing Sheets

U.S. PATENT DOCUMENTS

| | | | |
|---|---|---|---|
| 4,935,922 | 6/1990 | Wicklund et al. | 370/60 |
| 5,016,159 | 5/1991 | Maruyama | 364/200 |
| 5,020,052 | 5/1991 | DePrycker et al. | 370/60 |
| 5,048,014 | 9/1991 | Fischer | 370/85.5 |
| 5,107,489 | 4/1992 | Brown et al. | 370/58.2 |
| 5,119,367 | 6/1992 | Kawakatsu et al. | 370/54 |
| 5,140,585 | 8/1992 | Tomikawa | 370/60.1 |
| 5,151,897 | 9/1992 | Suzuki | 370/85.13 |
| 5,166,926 | 11/1992 | Cisneros et al. | 370/60 |
| 5,184,346 | 2/1993 | Kozaki et al. | 370/60 |
| 5,241,550 | 8/1993 | Kusano | 371/71 |
| 5,243,699 | 9/1993 | Nickolls et al. | |
| 5,274,631 | 12/1993 | Bhardwaj | 370/60 |
| 5,379,289 | 1/1995 | DeSouza et al. | 370/85.13 |
| 5,379,296 | 1/1995 | Johnson et al. | 370/60 |
| 5,386,413 | 1/1995 | McAuley et al. | 370/54 |
| 5,430,762 | 7/1995 | Vijeh et al. | 375/211 |
| 5,434,861 | 7/1995 | Pritty et al. | 370/543 |
| 5,446,726 | 8/1995 | Rostoker et al. | 370/17 |
| 5,457,679 | 10/1995 | Eng et al. | 370/16 |
| 5,521,913 | 5/1996 | Gridley | 370/58.2 |
| 5,560,038 | 9/1996 | Haddock | 395/800 |
| 5,568,476 | 10/1996 | Sherer et al. | 370/60 |

METHOD AND APPARATUS FOR DIRECTING DATA PACKETS IN A LOCAL AREA NETWORK DEVICE HAVING A PLURALITY OF PORTS INTERCONNECTED BY A HIGH-SPEED COMMUNICATION BUS

RELATED APPLICATION

This application is a continuation-in-part of an earlier filed U.S. Pat. application of the present inventor, titled "METHOD AND INTEGRATED CIRCUIT FOR HIGH-BANDWIDTH NETWORK SERVER INTERFACING TO A LOCAL AREA NETWORK", Ser. No. 08/371,499, filed Jan. 11, 1995.

BACKGROUND OF THE INVENTION

1. Field of the Invention

The invention relates generally to computer interfacing and specifically to local area networks (LANs) with many client workstations that communicate with one or more network servers, such as where the LANs have parallel segments.

2. Description of the Prior Art

Personal computers and engineering workstations are conventionally interconnected into local area networks (LANs) that allow messages to be sent and programs to be downloaded, e.g., from file servers on the LAN. The ETHERNET™ is an example of a shared-access LAN now in widespread use, and was originated by a joint effort of Intel Corporation, Xerox Corporation and Digital Equipment Corporation. The ETHERNET was defined as a ten megabit per second (Mbps) network that allowed every node on the LAN to transmit and receive. Collisions of data could occur when such two nodes try to transmit at the same time. Such conflicts are resolved automatically by postponing each retransmission after a different random waiting period.

Many variations in ETHERNET have been subsequently developed, e.g., "10BASE-T", "10BASE-2", "10BASE-5", "100BASE-VG", and "100BASE-X", as well as variations in speeds including ten Mbps, twenty Mbps, one hundred Mbps, and beyond. Different modes of ETHERNET also exist, e.g., conventional half-duplex, and full-duplex ETHERNET switch (FDES).

Ordinary LANs are more than ever being overloaded by faster engineering workstations and distributed file systems, such as NFS, LAN MANAGER, and NETWARE. Such networks quickly become congested and causes long processing delays and broken connections. So dividing networks into smaller parts to avoid traffic congestion has been popular. Bridges allow large LAN's to be divided into several parallel segments. Intra-segment traffic can proceed in parallel amongst the several segments. But the store-and-forward limitations of bridging of any type takes time and can cause transmit delays for messages moving from one segment to another. Routers also allow individual LANs to be inter-tied and are used with protocols that can report inter-network congestion and other anomalous conditions back to end nodes, e.g., the ICMP protocol.

Single-chip integrated circuit devices are sold commercially that provide ETHERNET functionality in a convenient ready-to-use form that is easy to integrate onto a plug-in LAN adapter board. However, such network interface controllers (NIC's) operate the same, whether a server, a hub, or a client. But servers or hubs see much higher traffic demands because they are at the focus of network activity. A single server or hub is often subjected to parallel access requests from many clients, albeit all have the same data transfer speed limitations.

A systems-oriented network interface controller (SONIC) with a twisted pair interface is marketed by National Semiconductor (Santa Clara, Calif.) in a single integrated circuit as the "DP83934 SONIC™-T". The SONIC-T is a second generation ETHERNET controller for sixteen and thirty-two bit system interfacing. A high speed direct memory access (DMA) controller takes five percent of the bus bandwidth. A selectable bus mode provides for big-endian and little-endian byte ordering. A linked-list buffer manager permits a range of uses from personal computer (PC) adapters to high-speed motherboard designs. A fully compatible Institute of Electrical and Electronic Engineers (IEEE) standard number 802.3 (IEEE 802.3) encoder/decoder (ENDEC) and a twisted pair interface (TPI) allow for a one chip 10BASE-T ETHERNET solution. A National Semiconductor coaxial transceiver interface, e.g., marketed as "DP8392", permits the construction of 10BASE2 or 10BASE5 systems. The buffer manager processes receive and transmit packets in the system memory, therefore eliminating intermediate packet copying. The receive buffer manager uses three areas in memory for additional resource allocation, status indication, and packet data buffering. The SONIC-T stores received packets in the buffer area and indicates the receive status and control information in a descriptor area. The transmit buffer manager uses two memory areas, one for status and control indication and the other for fetching packet data.

Conventional SONIC single-chip devices include a twisted pair interface (TPI), an encoder/decoder (ENDEC), a media access controller (MAC) unit, separate receive and transmit first-in first-out (FIFO) registers, a system buffer management engine and a user programmable system bus interface unit. Pipelined architectures are used to increase system-level performance. The TPI preferably has five main logic units, e.g., a smart squelch, a collision detector, a link detector/generator, a jabber and a transmitter. The smart squelch determines if valid data is present at the inputs. The collision detector checks for simultaneous data transmission and reception on the inputs and outputs. The link detector/generator checks the cable integrity. The jabber prevents the transmitter from outputting too long a packet. The transmitter uses summing resistors and a transformer/filter to output Manchester encoded data. The ENDEC interfaces between either the TPI or the ETHERNET transceiver and the MAC unit. It provides Manchester data encoding and decoding functions for IEEE 802.3 ETHERNET, so called Thin-ETHERNET, or twisted-pair types of LANs. The ENDEC combines non-return to zero (NRZ) data from the MAC unit and clock pulses into Manchester data and sends the data differentially to the transmitter, e.g., in the TPI. During reception, a digital phase locked loop (DPLL) decodes the Manchester data into NRZ-formatted data and into a receive clock. The MAC unit controls media access of transmitting and receiving packets. The MAC unit frames information from a transmit FIFO for transmission and sends serialized data to the ENDEC. The transmit FIFO is arranged as a four-byte wide and eight deep memory array. Incoming information from the ENDEC is de-serialized and frame-checked for validity. Received data is transferred to a receive FIFO. The receive FIFO is also arranged as a four-byte wide and eight deep memory array. Control and status registers are used to manage the MAC unit. The host interface of the SONIC chip preferably has two parts, the control part and the data part. The control part consists of sixty-four addressable registers, an interrupt line, a reset signal, and a chip select line. The data part of the interface uses the DMA transfers between the FIFO's in the SONIC chip and the host memory.

In conventional SONIC devices, a content addressable memory (CAM) is included in the MAC receiver to assist an address recognition unit. A CAM address mismatch causes a packet to be rejected whenever the destination address in the packet does not match an address stored in the CAM. When matches do occur, a de-serializer passes a packet remainder to the receive FIFO. A protocol state machine is included in the MAC transmitter to enforce the carrier sense multiple access with collision detection (CSMA/CD) protocol of the ETHERNET. The carrier sense and collision signals are monitored for network activity. Transmission is deferred if the network is busy. Otherwise, an inter-frame gap timer (9.6 microseconds) times-out and transmission begins. Any network activity detected in the first 6.4 microseconds will restart the timer. Otherwise, network activity is ignored and transmission begins at the end of the current 9.6 microsecond period. If a collision with another transmitter is then detected, a four byte jam pattern of all ones is immediately substituted before terminating the failed transmission. A random number of times slots is inserted as a wait period, where each time slot is 51.2 microseconds. A truncated binary exponential back-off algorithm is used to determine when another transmission should be attempted.

Conventional SONIC single-chip devices provide only one kind of network interface that must be used by network clients and servers alike. But this is the genesis of a network congestion because all the clients on a single segment tend to focus their traffic on the lone segment server. Such concentration necessitates higher bandwidth performance for the server link than is required for the client links, otherwise long waiting queues for server action can develop and bog down network performance.

Two industry groups are presently working on one hundred Mbps ETHERNET that can use unshielded twisted pair (UTP) cabling, the "Fast ETHERNET Alliance", and the "100VG-AnyLAN group". The first is spearheaded by a company called Grand Junction, and comprises a 100-Base-X which uses two pairs of category-five UTP's and a revamped CSMA/CD protocol. The later group is spearheaded by Hewlett-Packard Corporation; and uses four pairs of category-three UTP's for one hundred Mbps operation. An IEEE committee preferably has sanctioned the technology as the "802.12 standard", and its cabling scheme is referred to as the "100Base-VG standard". Unfortunately, the one hundred Mbps technology requires an expensive new cable system and the chip sets are not currently available. So it preferably has been slow in gaining wide acceptance.

ETHERNET switching is a recent technology that provides for the interconnection of individual ETHERNET LAN segments by a central switch. A telephone private branch exchange (PBX) is conceptually similar. Within the ETHERNET switch, paralleled circuit switching allows the simultaneous transport of multiple packets across the switch. "Cut-through" switching improves the throughput by reducing packet buffering, e.g., by reading only a destination address part of each ETHERNET packet. A full-duplex ETHERNET, "FDES", offers ten Mbps channels in each direction and a realizable data transfer rate of twenty Mbps. Such products are commercially marketed by Kalpana, Inc., (Sunnyvale, Calif.) under the ETHERSWITCH trade name.

However, ETHERNET switching, and other conventional technologies are implemented with discrete electronics that are costly and prone to failure Local area network (LAN) switching is essentially a conventional multiport bridge, but with low packet latency and the ability to do simultaneous switching of multiple packets. Conventional LAN switches are based on the use of one or more microprocessors in conjunction with ETHERNET™-type network interface controllers. Most such switches are software implementations, but others use proprietary application specific integrated circuits (ASIC's) to assist a main microprocessor. For example, Kalpana's PROSTACK™ switch uses a crosspoint matrix to do packet switching. But, it still relies on microprocessors to do other functions such as path discovery, packet buffering, and the scheduling of simultaneous switching.

SUMMARY OF THE PRESENT INVENTION

It is therefore an object of the present invention to provide a network interface controller on a single integrated circuit that offers a path discovery, a complete switching fabric, a packet buffering control, a scheduling of multiple switching activities and a CAM emulation.

It is a further object of the present invention to provide network interface controller on a single integrated circuit that can cut-through packets between segments using a path discovery content-addressable memory function.

Briefly, a local area network (LAN) device embodiment of the present invention comprises a plurality of local area network interface ports each including one receiver, one transmitter and one triplet processor, a high-speed data bus to which individual ones of the plurality of local area network interface ports are connected, and a switch engine connected to the high-speed data bus and including a packet buffer controller, a high-speed data bus controller and content-addressable memory manager, i.e., the CAM emulator. Each triplet processor operates independently and simultaneously to execute cut-through packet switching or store-and-forward packet switching using the high-speed bus.

An advantage of the present invention is that a system is provided that provides quick, efficient cut-through between network segments with zero host processor overhead.

A further advantage of the present invention is that a system is provided that improves the effective bandwidth of a server or a hub connected to a local area network These and other objects and advantages of the present invention will no doubt become obvious to those of ordinary skill in the art after having read the following detailed description of the preferred embodiment that is illustrated in the various drawing figures.

DETAILED DESCRIPTION OF THE PREFERRED EMBODIMENTS

Figure 1:
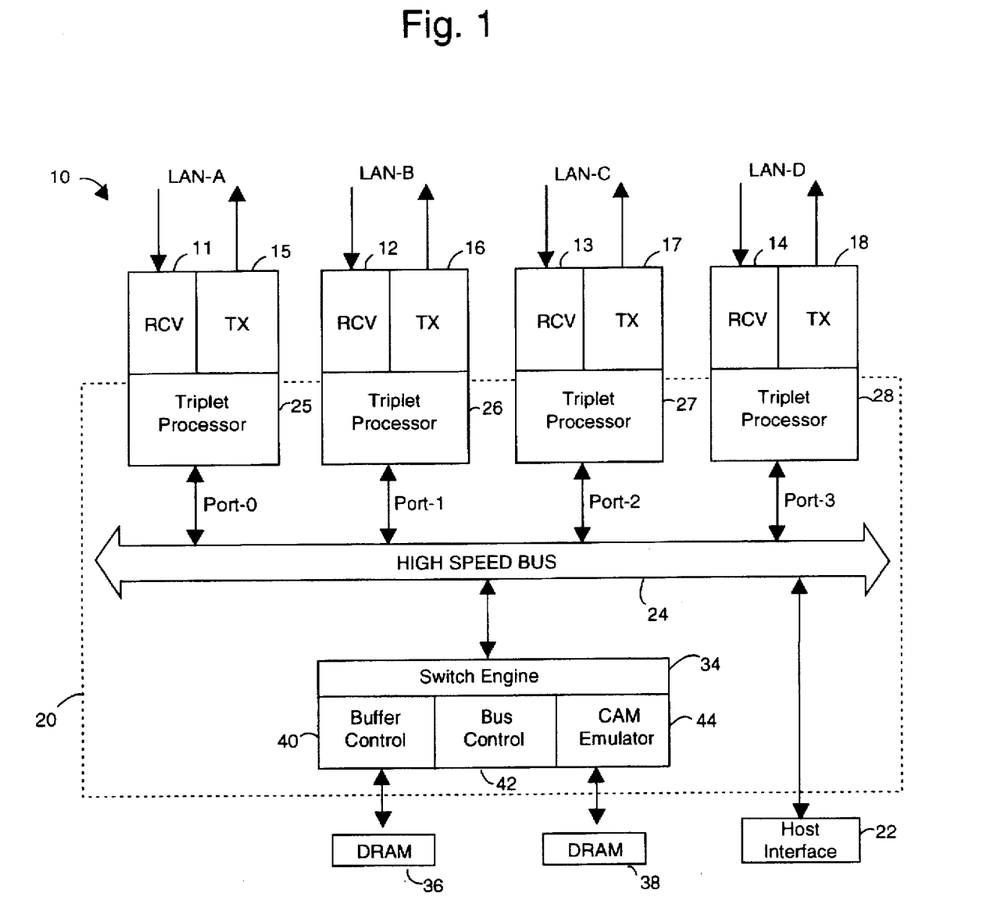
FIG. 1 is a block diagram of single-chip integrated circuit LAN device embodiment of the present invention that provides cut-through amongst four LAN segments.

In FIG. 1, in a first embodiment of the present invention, a local area network (LAN) device is referred to by the general reference numeral 10. Preferably, the LAN device 10 is completely disposed on a single semiconductor integrated circuit (IC) and comprises a set of four independent receivers 11–14 with a set of four corresponding independent transmitters 15–18, all of which connect to an arbiter 20, and include a twisted pair interface (TPI), a packet encoder-decoder (ENDEC) and a media access controller (MAC) with a MAC transmitter and a MAC receiver. The use of four sets of receivers and transmitters is merely exemplary, two or more such sets may be used to advantage. A "LAN-A" is connected to a port-0 receiver 11 and transmitter 15. A "LAN-B", is connected to port-1 receiver 12 and transmitter 16 directly over the bus 24. A "LAN-C" is connected to a port-2 receiver 13 and transmitter 17. A "LAN-D", is connected to port-3 receiver 14 and transmitter 18. LAN-A through LAN-D can each have data-packet traffic that needs to be interconnected with one of the other LAN's, and may comprise 10BASE-X, 100BASE-X, 100BASE-VG, FDES, short-haul and/or asynchronous transfer mode (ATM) topologies. The arbiter 20 manages on-chip "cut-though" switching between the receivers and transmitters 11–18 for low data-packet transmission latency. The arbiter 20 connects to a host interface 22 with a high-speed on-chip bus 24.

Each pair of receivers and transmitters 11–18 is associated with a triplet processor 25–28. On-chip switching of packets between LAN's is transparent to the host interface 22 and involves, for example, sending a packet from LAN-A to LAN-B by using a short cut over the bus 24. With multiple on-chip switching, more than one packet can be switched through by the arbiter 20 at the same time, e.g., switching packets from LAN-A to LAN-B while another packet is being independently switched from LAN-D to LAN-C. Such switching action is executed immediately if the destination receiver-transmitter pair is currently free to transmit a packet, otherwise, a switch engine 34 stores the packets in a dynamic random access memory (DRAM) 36 for "store-and-forward"packet switching later. Another DRAM 38 is connected to the switch engine. A buffer controller 40, a bus controller 42 and a content addressable memory (CAM) emulator 44 are included in the switch engine 34.

Figure 2A:
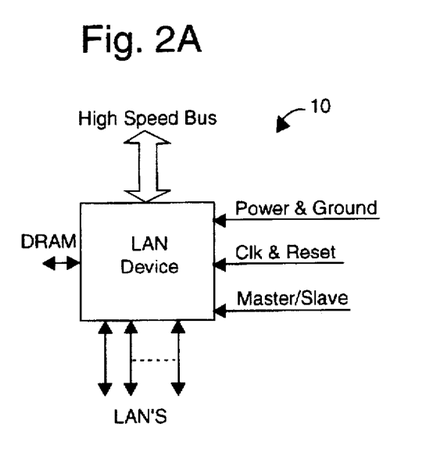
FIG. 2A is a block diagram representing the external pinout of the LAN device of FIG. 1.

FIG. 2A shows a first general pin-out of the LAN device 10. Four groups of external connection pins are provided for the high speed bus 24, the DRAM interface, the LAN interfaces, and the usual overhead such as power and ground, clock, reset, and master/slave. Less complex versions are possible.

Figure 2B:
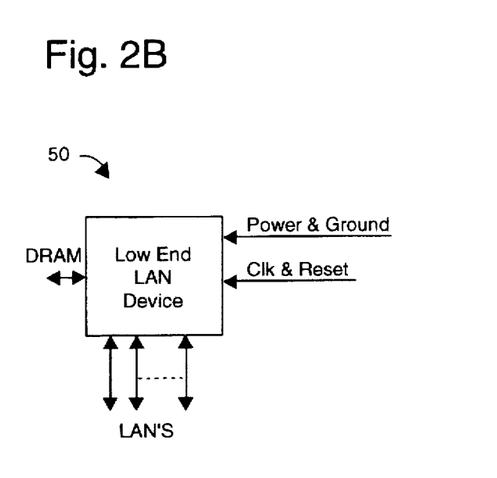
FIG. 2B is a block diagram representing the external pinout of a reduced LAN device similar to that of FIG. 1.

FIG. 2B shows the pinout needed for a simplified version LAN device 50. Such simplified versions can be used for the low cost products to replace a 10BASE-T hub. The bus pin connections are unnecessary in such low-end applications.

Figure 2C:
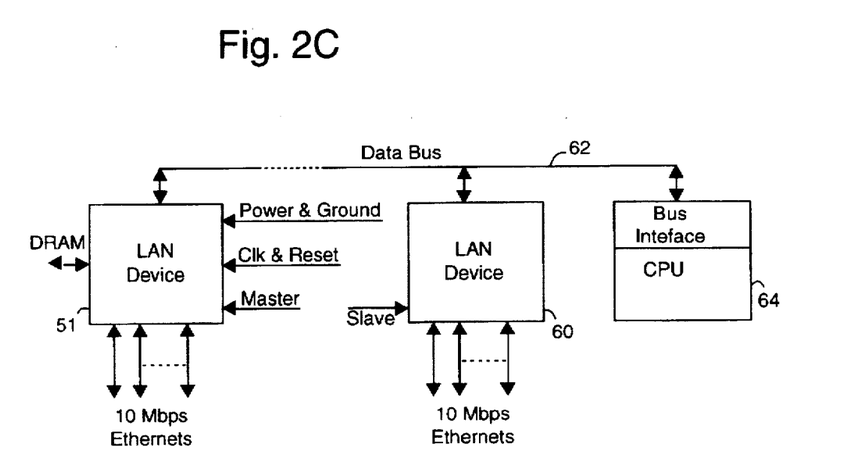
FIG. 2C is a block diagram of a system that combines multiple LAN devices and a microcomputer on a single bus, wherein the bandwidth of the bus needs to be twice the sum of the constituent bandwidths of those devices that populate the bus.

FIG. 2C represents the way that the individual ten Mbps bandwidths of each of ten LAN devices 51–60 can aggregate such that the system bus traffic can reach several hundred Mbps, and so the supporting DRAM preferably has to match this speed. In practice, the bandwidth of a high speed bus 62 must be at least twice the speed. Bandwidths of 500 Mbps or less are often referred to as normal by conventional standards. In FIG. 2C the LAN devices 51–60 are shown cascaded and only one LAN device 51 is enabled to operate as a "master". The others are configured as "slaves". FIG. 2C also shows that an external microprocessor 64 can be attached to the high speed bus 62 and used for management function or special types of routing and filtering.

Figure 2D:
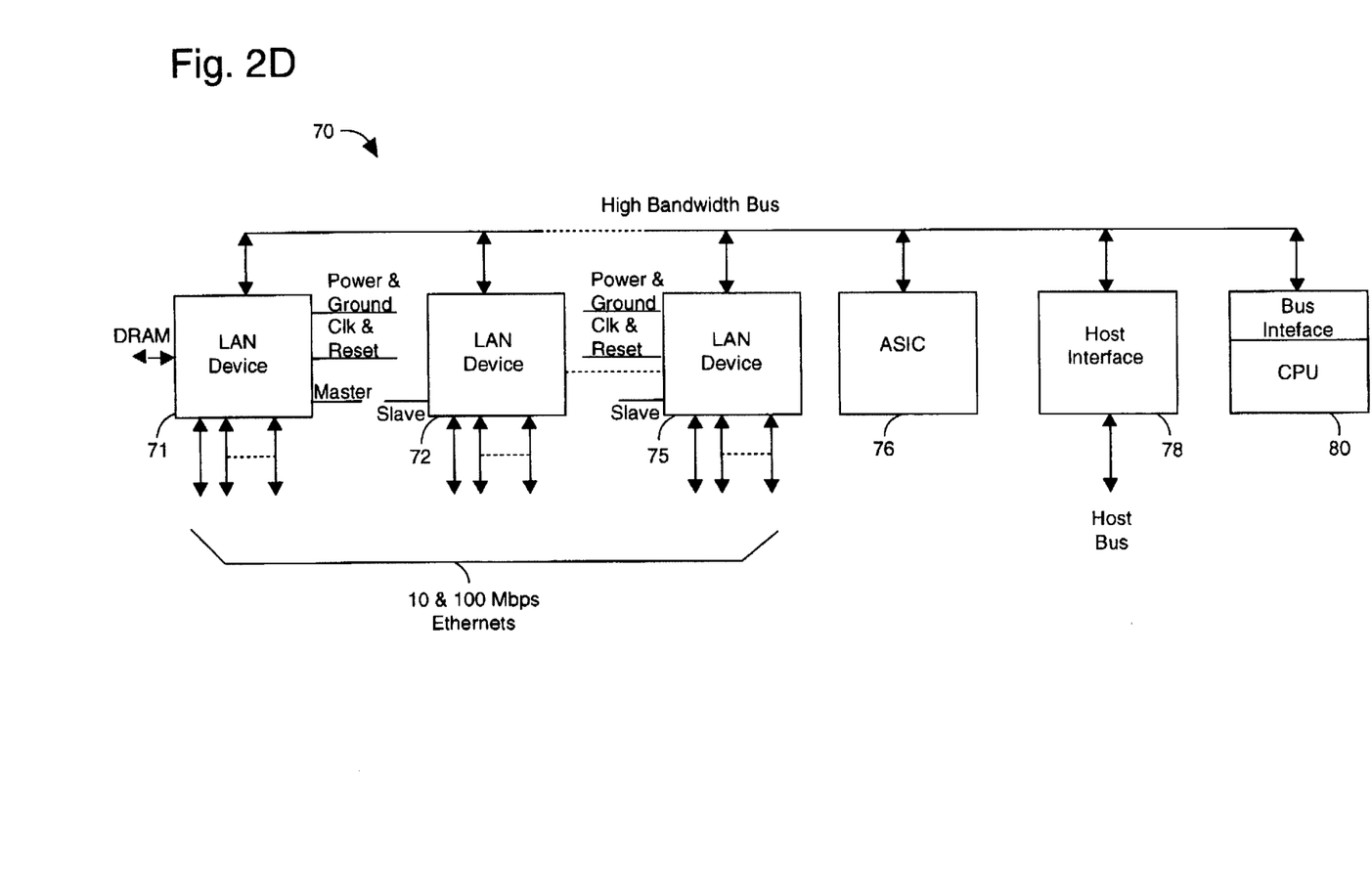
FIG. 2D is a block diagram of a high-bandwidth collapsed backbone switch that combines multiple LAN devices, an ASIC, a host interface and a microcomputer on a single high bandwidth bus.

FIG. 2D shows a high-bandwidth collapsed backbone switch 70 with a minimum bandwidth of one gigabit per second. This system supports multiple LAN devices 71–75 and other bus entities such as an application specific ASIC 76, a host interface 78, and microprocessor (CPU) 80.

Figure 3:
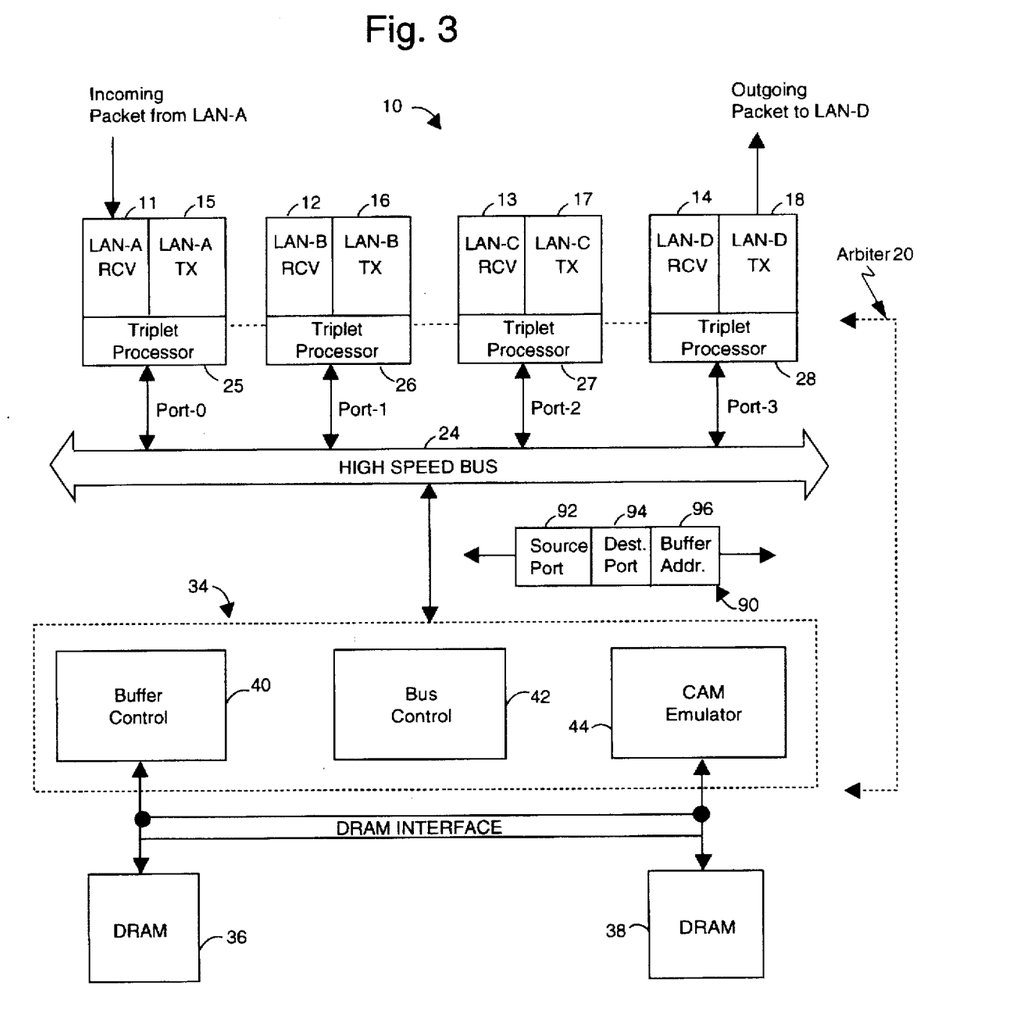
FIG. 3 is a data flow diagram that represents the communication of a triplet data structure over the bus and between various processing elements in a structure similar to that of FIG. 1.

In FIG. 3, the LAN device 10 of FIG. 1 is more-or-less repeated with the addition of a triplet data structure 90 that implements a switching mechanism for communication amongst LAN's A–D. The triplet data structure (triplet) 90 comprises a first field 92 with a source port number, a second field 94 with a destination port numbers and a third field 96 with a starting address of the packet buffer. The use of the triplet data structure 50 can be described in an example where a workstation on LAN-A sends a packet to a workstation on LAN-D. The incoming packet enters receiver 11, e.g., port-0. A twelve byte header in the incoming packet comprises the source and the destination addresses for the whole packet. When these first twelve bytes are received, the triplet processor 25 interrupts the switch engine 34 to get immediate packet switching service. In response to service requests, the switch engine 34 fetches these twelve bytes over the high speed bus 24 and signals the content-addressable memory manager 44 and the buffer controller 40.

The content-addressable memory manager 44 uses the destination address in the header to look-up in a database in the content-addressable memory manager 44 the port, if any, through which the destination workstation can be reached. This look-up is implemented with a process called "path discovery". For example, assume that path discovery indicates that a destination workstation can be reached via port-3. Such information is transferred to the bus controller 42. In response to the service request, the buffer controller 40 then assigns a packet buffer space in the DRAM 36 to store the incoming packet. The starting address of the packet buffer in DRAM 36 is then handed to the bus controller 42.

Triplets 90 are broadcast to the high speed bus 24 by the switch engine 34 and accepted by the corresponding triplet processor 25–28, if its associated transmitter 15–18 is currently free. The other triplet processors 25–28 ignore the broadcast. Once the triplets 90 are broadcast, the switch engine 34 ceases to be an active participant in the LAN-to-LAN switching operation. The continuing responsibility is taken up by the source oort and the destination port. Such division of labor between the switch engine 34 and the receiver-transmitter pairs, e.g., the ports, simplifies the implementation and functioning of multiple concurrent switching.

Continuing with the example of LAN-A having a data packet for LAN-D, the triplet processor 25 must handle the transfer of the packet to the high speed bus 24. The packet is sent to both transmitter 18 and the packet buffer in DRAM 36 at the same time so that the packet can be output to LAN-D immediately for cut-through if the transmitter 18 was not busy. But, when the transmitter 18 is busy, the triplet processor 28 can afford to initially ignore the initial triplet. The triplet can be fetched after its loading of the packet into the packet buffer DRAM 36 was completed. When the transmitter 18 frees up, the triplet processor 28 must actively fetch the data from the packet buffer in DRAM 36. To do this, the triplet processor 28 must initiate the proper sequence of bus cycles to gain access to the stored packet.

The use of triplets 90 makes it possible to build a one-chip plus DRAM implementation of a LAN switch that is capable of autonomously supporting multiple simultaneous switching of packets. The triplet data structure 90 provides the glue that binds these components together to form an efficient LAN switch.

The high speed bus 24 preferably has a scaleable bandwidth, and a simple bus protocol. The bus bandwidth can be made scaleable by using a different number of data lines for each implementation, e.g., 32, 64, 128, etc., and by using different clock rates, e.g., 33 MHz, 66 MHz, 100 MHz; etc. For bus protocols, all bus entities can be viewed as ports, with the possible exception of the switch engine 34. Each port preferably has a designated port number and includes addressable registers and memory cells that are accessible to all other ports. Six bus commands, and seven bus states would be useful.

The high speed bus 24 can be built to be structurally similar to the conventional industry-standard "PCI bus". It preferably has 32 or 64 address/data lines, and eight command/byte enable lines, FRAME, TRDY, IRDY, STOP, DEVSEL, RESET, CLOCK, PKTREC, $SOURCE_{13}PORT_{13}STATUS$, $DESTINATION_{13}PORT_{13}STATUS$, $SWITCH_{13}ENGINE_{13}STATUS$, and RESERVES. The high speed bus 24 timing can also borrow from the timing of the PCI bus.

Figure 4:
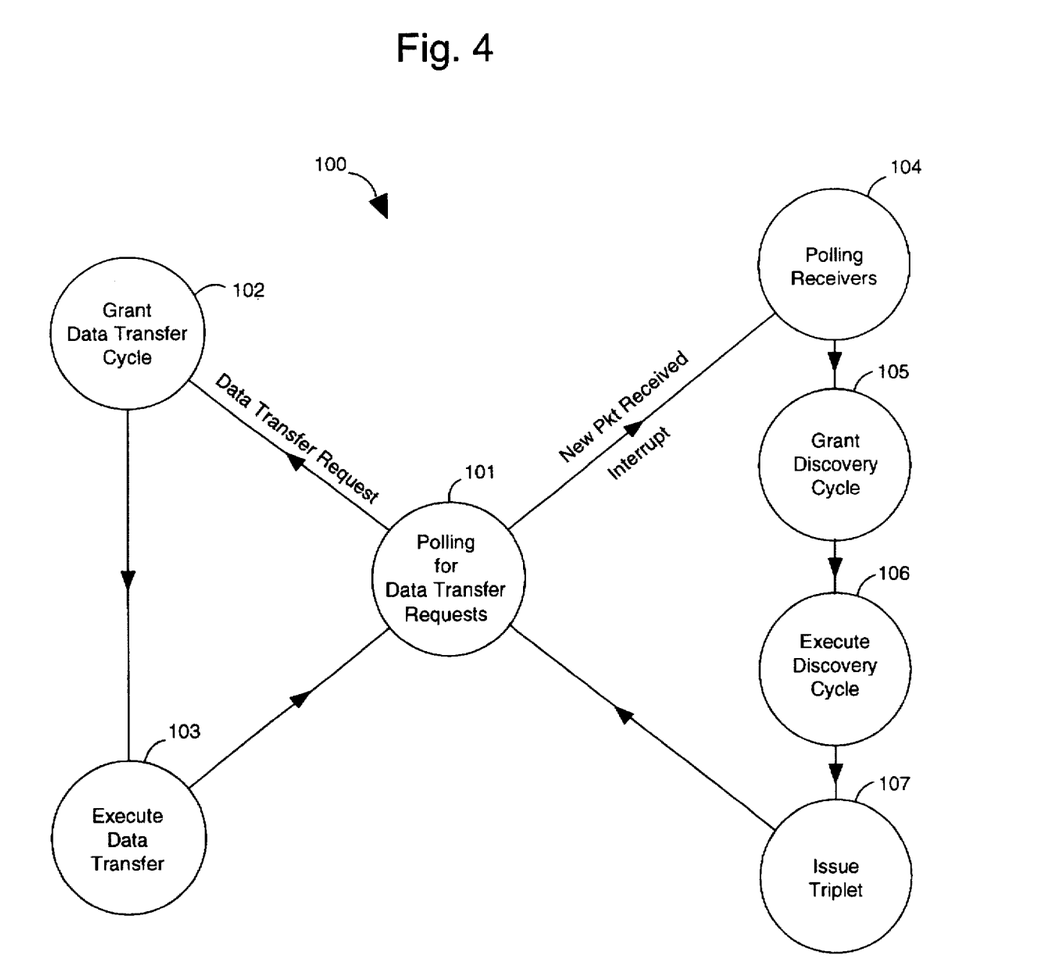
FIG. 4 is a main state diagram of a switch engine included in the LAN device of FIG. 1.

FIG. 4 illustrates a bus state machine 100 that the bus controller 42 manages. The state machine includes a main state 101 for polling data transfer requests. When a data transfer request is recognized, a state 102 grants the data transfer cycle and a state 103 executes the data transfer. A state 104 polls the receivers 11–14. A state 105 grants discovery cycle requests. A state 106 executes a discovery cycle. And a state 107 issues a triplet 90. The main state 101 polls the LAN ports for bus service, and uses a prioritized rotational schedule to allot bus cycles to contending ports. It also enforces a watchdog function to prevent bus hogging. The bus controller 42 monitors the PKTREC line for interrupts from ports that are receiving new packets. This interrupt is processed quickly in hardware to execute a cut-through operation as shownn FIG. 4.

The main state 101 polls for data transfer requests from the attached ports and uses a priority schedule to grant data transfer cycles to the contending ports. To avoid bus hogging by any one port, a time limit is imposed for each grant cycle. The main state 101 can be interrupted when one of the ports receives a packet. A discovery procedure then issues a triplet 90. In an exemplary embodiment, six bus commands are used: $roll_{13}call$, $get_{13}requests$, $bus_{13}grant$, $get_{13}interrupt_{13}id$, $get_{13}twelve_{13}bytes$, and $set_{13}triplet$.

The $roll_{13}call$ command resets and acquires parameters from all the ports. These parameters includes port number, type of function, priority level, broadcast domain, and others.

The $get_{13}requests$ command polls all the ports simultaneously for bus service. One or more requests can be acquired per poll.

The $bus_{13}grant$ command is issued to a specific port at the beginning of this command. The addressed port becomes the bus master for the remaining period of the command. It may address any ocher port for read/write operation to its register or its memory. It can also access the packet buffer. A maximum time limit is imposed on this command to prevent "bus hogging" by a user port. During the switching operation, the port that is inputting data to the bus, provides the triplet, and information relating to the progress of the transfer, e.g., the beginning, and the end of the packet, etc. to the bus.

The $get_{13}interrupt_{13}id$ command is issued by the switch engine 34 to identify the ports that have set an interrupt line to indicate the reception of a packet.

The $get_{13}twelve_{13}byte$ command is issued by the switch engine 34 to interrogate a source port for the first twelve bytes, e.g., two addresses, of the incoming packet.

The $set_{13}triplet$ command broadcasts the triplet to the bus for the addressed ports. The destination port may refuse the incoming packet as a result of its filled triplet FIFO. The source port may respond by jamming or by enacting any other suitable flow control measure.

The switching operation depends on a content addressable memory function for its high speed cable lookup function. The switch engine 34 uses the six-byte medium access control (MAC) address of the workstation as the entry into a table to determine its port number. The content-addressable memory manager 44 and DRAM 38 substitute for a special-purpose content addressable memory (CAM) with some tolerable degradation in speed. The content-addressable memory manager 44 can be implemented as a state machine using gates and read-only memory, and the external DRAM 38 is used for CAM data storage, e.g., using a set of linked lists. Each item in the linked list shares a common hash key, e.g., the least significant byte (LSB) of the six-byte MAC address.

To search an emulated CAM, the LSB of the workstation's MAC address is used to acquire a pointer to the desired linked list from a hash table. Each item is searched in the list until a match of the entire six-byte address is achieved. The found data items include the parameters associated with the workstation under question, e.g., the port number through which the workstation can be accessed. Updating the CAM involves either adding an item, e.g., a workstation, or deleting an item to the linked list.

Figure 5:
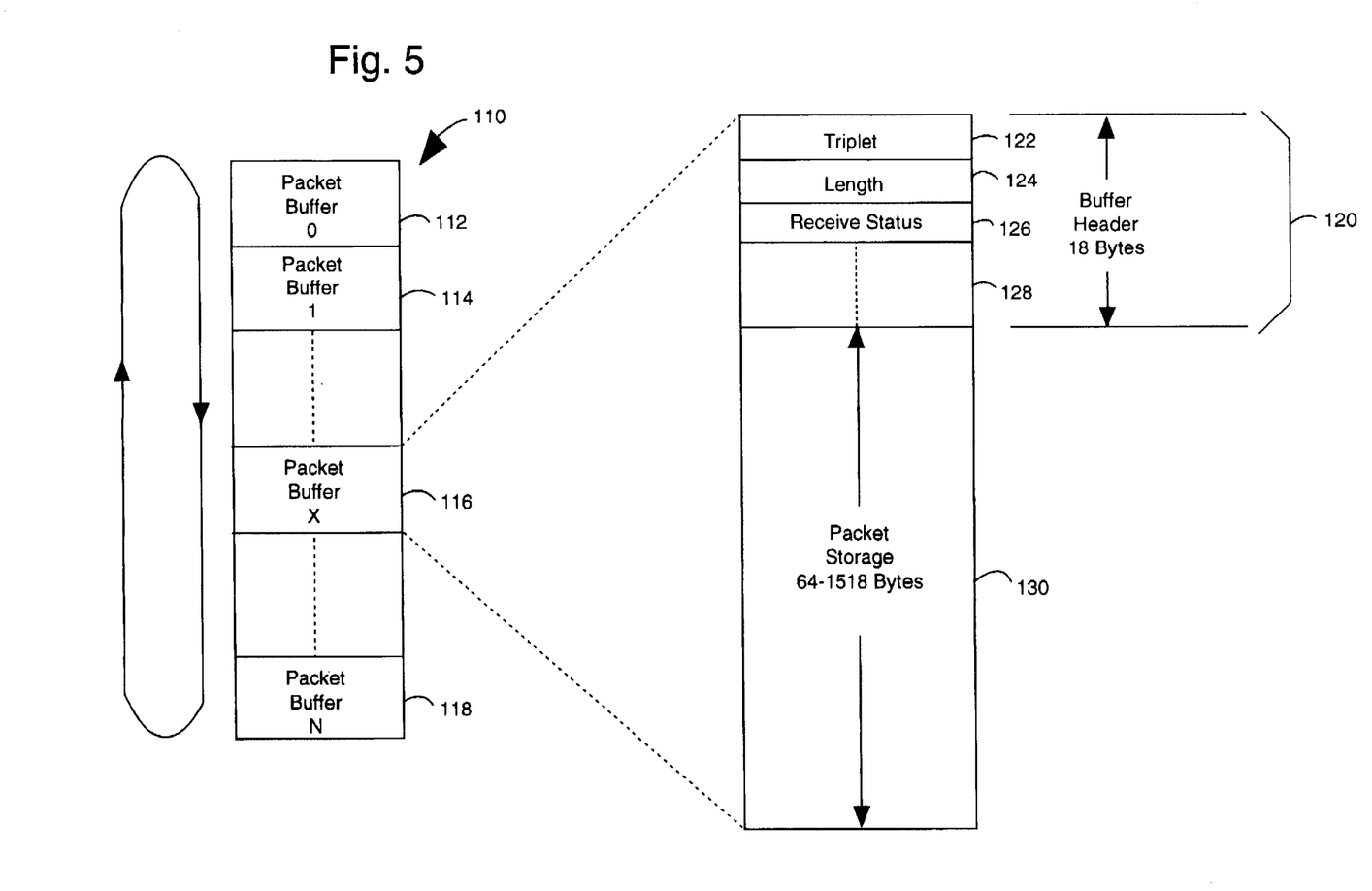
FIG. 5 is a block diagram of the packet buffer data structure included in the LAN device of FIG. 1.

FIG. 5 illustrates a typical circular buffer 110 that resides in the DRAM 36 and that is manipulated by the buffer controller 40. A plurality of packets 112, 114, 116, and 118 are included and earmarked for LAN-to-LAN switching operations. Each packet, e.g. packet 116 comprises an eighteen-byte header 120 that includes a triplet field 122, a length descriptor 124, a receive status 126 and a miscellaneous field 128 followed by a storage area of 64–1518 bytes. The header is constructed by the source port after the packet is written into the buffer. This header is used by the destination port for identification, for retrieval, and for checking the data integrity of the packet. The size of this buffer can be calculated by specifying a worst case latency for the switch, and a maximum aggregate speed of the ports. The product of these two indicates the size of the buffer. Because the buffer is used as a ring storage, this DRAM is guaranteed to keep a packet in its store for a minimum of fifty milliseconds before it is overwritten.

Figure 6:
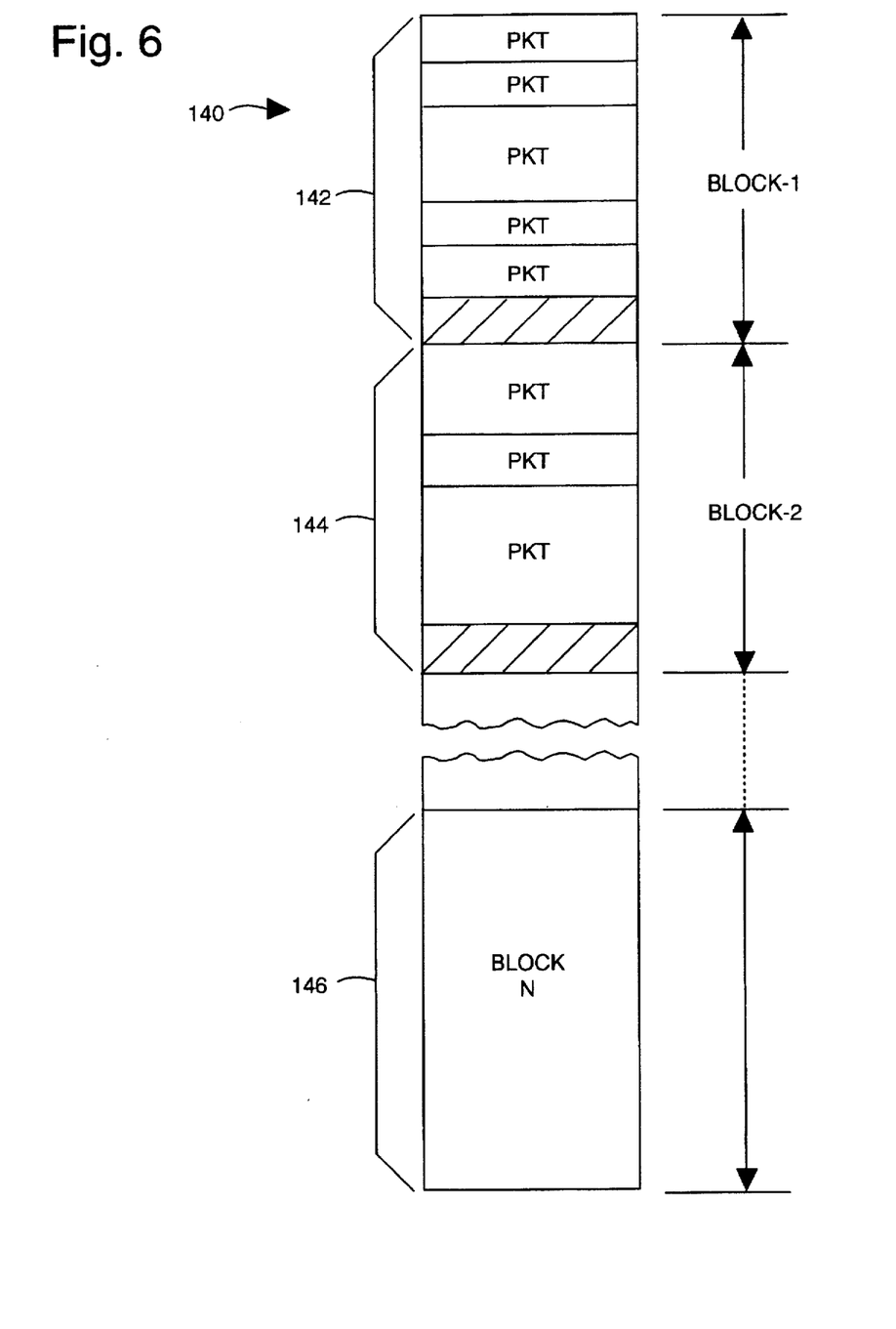
FIG. 6 illustrates a way of organizing a packet buffer included in the LAN device of FIG. 1.

FIG. 6 illustrates a buffer 140 that has been divided into equal size blocks 142, 144, 146. The buffer controller 40 preferably has facilities to manage multiple concurrent readers and writers, and to pack packets of different sizes. Each new incoming packet is preferably assigned to a block that is not currently being written. If all blocks are being written, then the new incoming packet is assigned to the block with the most available memory space while leaving a maximum space of 1536 bytes for the packet ahead of it. Overwriting occurs only after all the blocks are full.

The LAN device 10 is preferably capable of accommodating various types of receiver-transmitter pairs, e.g., 10BASE-T, 100BASE-X, 100BASE-VG, Kalpana full-duplex, short haul, ATM, etc. The number of receiver-transmitter pairs practical in a single LAN device 10 is principally limited by the bandwidth of the high speed bus 24, and the DRAM 36.

In order to provide for easy expansion in alternative embodiments, the receiver-transmitter pairs 11–14 and 15–18 (FIG. 1) preferably have a uniform interface 30–33 to the high speed bus 24 through the corresponding triplet processor 25–28 regardless of the types of receiver-transmitter pairs. This modularity offers easy expansion for the user, and cost savings for the chip manufacturer.

Figure 7:
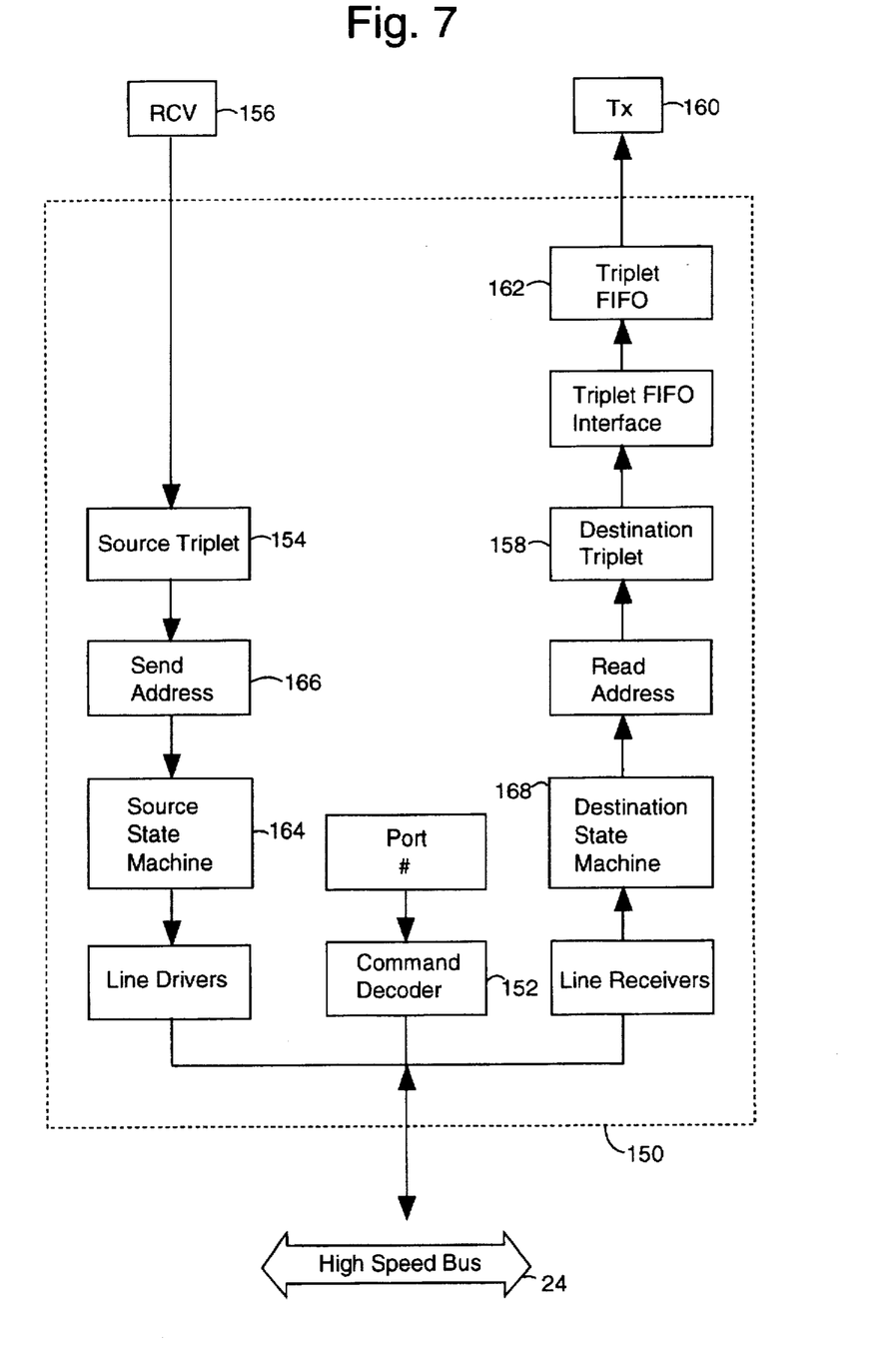
FIG. 7 diagrams the triplet process included in the LAN device of FIG. 1.

FIG. 7 illustrates a state-machine implementation of a triplet processor 150 that is similar to the triplet processors 25–28. A command decoder 152 monitors, e.g., the high speed bus 24 for commands issued by the switch engine 34. The command decoder 152 recognizes the intended target of the command by comparing a hardware assigned port number with a port number coded in each command. The command decoder 152 preferably responds to at least six different commands. The triplet processor further comprises a source triplet 154 that services a local receiver 156, similar to receivers 11–14. A destination triplet 158 services a local transmitter 160, which is similar to transmitters 15–18. The destination triplet side further includes a triplet first-in-first-out register (FIFO) 162. State machines to keep track of the packet processing progress are useful in the implementation.

A source state machine 164 is used to send packets and headers in real-time. Each destination port is automatically alerted that it should retrieve such packets from the buffer when a triplet is placed on the bus 24. A code is used also to signal that a complete packet has been stored. The destination port then loads the triplet 90 into its triplet FIFO 162. It is important that each destination port does not load triplets into its FIFO 162 when the triplets 90 first appear on the bus during a set$_{13}$triplet command. A send address counter 166 provides a buffer address for each installment of the data or the header. A source triplet register keeps the triplets sent by the switch engine 34 with a set$_{13}$triplet command for the entire sending process time. The command decoder 152 and the source state machine 164 synchronize operations in sending data to the high speed bus 24 for the bus$_{13}$grant command.

The destination side of the triplet processor 150 typically will be more complex than the source side because the destination side must handle two types of packet inputs, a cut-through input and a packet buffer input.

The cut-through input is easier to implement because the destination side is a passive receiver. Inputting the packet from a buffer requires more than the cut-through input. A destination state machine 168 fetches a oacket header which provides a verification of the desired packet by comparing the triplets. Receive status information in the header records whether the packet had been properly received. The packet is ignored if a received error is flagged. The destination state machine 168 also uses the length information in the header to fetch the packet, e.g., over several installments. For each installment, the destination state machine 168 requests a bus cycle to access the packet buffer using an address and a count. When the triplet is initially sent down by the switch engine 34 via the set$_{13}$triplet command, the destination port accepts it if its transmitter is free to transmit. If so, a cut-through operation is started. However, if the transmitter is not free at the reception of the set$_{13}$triplet command, the destination port must send a jam code, e.g., using DESTINATION$_{13}$PORT$_{13}$STATUS lines if the triplet FIFO is full. Otherwise it ignores the triplet at first and acquires it later from the source port when the packet is completely stored in the buffer. As a consequence, the delivery of the packet can be guaranteed under any traffic condition that does not violate the maximum latency criterion.

The present invention includes a method for communicating data packets between a plurality of local area network (LAN) segments connected to a multport LAN device. The method comprises inputting a first packet from a first client on a first LAN segment connected to a first port, wherein the first packet includes a first header that identifies a network source address corresponding to the first client and a network destination address corresponding to a second client on a second LAN segment connected to a second port. Interrupting a switch engine with a first triplet processor to transfer the first header to a packet buffer controller and a content-addressable memory while the first packet is still being received but after the first header is completely received by the first port. Associating in the content-addressable memory the network destination address with the second port. Assigning a first starting address in a circular packet buffer memory and transferring the whole of the first packet from the first port to the packet buffer memory as well as to the second port. Transmitting the first packet from the second port if the second port was not otherwise busy. Constructing a first triplet data structure comprising representations of the first port, the second port, and the first starting address and placing a copy of the first triplet data structure in front of the first packet in the packet buffer memory. Sending the first triplet data structure to a second triplet processor in the second port. If the first packet had not already cut-through and had been sent, then fetching the first packet from the packet buffer memory with the second triplet processor and comparing the copy of the first triplet data structure in front of the first packet to the first triplet structure received by the second triplet processor in the previous step And, transmitting the first packet from the second port if the triplet data structures match and the first packet had not already been sent.

Although the present invention preferably has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall wIthin the true spirit and scope of the invention.

What is claimed is:

1. A local area network (LAN) device, comprising:
 a plurality of local area network interface ports each including one receiver (11–14), one transmitter (15–18) and one triplet processor (25–28);
 a high-speed data bus (24) to which individual ones of the plurality of local area network interface ports are connected; and
 a switch engine (34) connected to the high-speed data bus (24) and including a packet buffer controller (40), a high-speed data bus controller (42) and a content-addressable memory manager (44);

wherein each said triplet processor (25–28) provides for the reading of a destination address in packets received from a corresponding one of said local area network interface ports and provides for cut-through transmission wherein packets are received from other ones of said local area network interface ports over the high-speed data bus (24) while such packets are still being received from the other ones of the network interface ports.

2. The LAN device of claim 1, wherein:

the plurality of local area network interface ports, the high-speed data bus (24), and the switch engine (34) are all disposed on a single integrated circuit semiconductor device (10) that provides for an external connection of a digital semiconductor memory (36, 38) to said packet buffer controller (40) and said content-addressable memory manager (44).

3. The LAN device of claim 1, wherein:

the switch engine (34) provides for the storing of any said packets in memory (36) in preparation for store-and-forward packet switching later if the intended transmitter (15–18) is busy with other traffic and not available for cut-through.

4. The LAN device of claim 1, further comprising:

a triplet data structure (90) for communication over the high-speed data bus (24) and that includes a first field (92) for a source port number, a second field (94) for a destination port number, and a third field (96) for a starting address of a packet buffer in said memory (36) assigned by said buffer controller (40).

5. The LAN device of claim 4, wherein:

the triplet processors (25–28) each provide for the inspection incoming packets that enter a corresponding receiver (11–14) and have a header that comprises the network source and destination addresses for the whole packet, and further provide for an interrupt to the switch engine (34) to get immediate packet switching service; and the switch engine (34) provides for a response to service requests from the triplet processors (25–28) by fetching said header over the high speed bus (24) and by signaling said content-addressable memory manager (44) and the packet buffer controller (40).

6. The LAN device of claim 1, wherein:

said content-addressable memory managaer (44) provides for an association of port addresses to network packet source and destination addresses, wherein an appropriate one of the plurality of local area network interface ports can be targeted according to network source addresses that have been generated by clients on a particular network port.

7. The LAN device of claim 2, wherein:

said content-addressable memory manager (44) includes path discovery means for transferring which destination client addresses can be reached via particular ports to said bus controller (42); and said buffer controller (40) provides for an assignment of a packet buffer space in said memory (36) to store the incoming packet in response to a service request, wherein a starting address for said packet buffer in said memory (36) is handed to said bus controller (42).

8. A system (10) for communicating data packets between a plurality of local area network (LAN) segments connected to a multiport LAN device, comprising:

first triplet processor means (25) for inputting a first packet from a first client on a first LAN segment connected to a first port, wherein said first packet includes a first header that identifies a network source address corresponding to said first client and a network destination address corresponding to a second client on a second LAN segment connected to a second port;

means for interrupting a switch engine (34) to transfer said first header to a packet buffer controller (40) and a content-addressable memory (44, 38) while said first packet is still being received but after said first header is completely received by said first port;

content-addressable memory means (44, 38) for associating said network destination address with said second port;

means (24, 40) for assigning a first starting address in a circular packet buffer memory (36) and for transferring the whole of said first packet from said first port to said packet buffer memory as well as to said second port;

transmitter means (18) for transmitting said first packet from said second port if said second port was not otherwise busy;

means (25) for constructing a first triplet data structure (90) comprising representations of said first port (92), said second port (94), and said first starting address (96) and for placing a copy of said first triplet data structure (90) in front of said first packet in said packet buffer memory (36);

means (25, 24) for sending said first triplet data structure to a second triplet processor (28) in said second port;

means (28) for fetching said first packet from said packet buffer memory if said first packet had not already cut-through and had been sent;

means (28) for comparing said copy of said first triplet data structure in front of said first packet to said first triplet structure received by said second triplet processor; and means (18) for transmitting said first packet from said second port if said triplet data structures match and said first packet had not already been sent.

9. A method for communicating data packets between a plurality of local area network (LAN) segments connected to a multiport LAN device, the method comprising:

inputting a first packet from a first client on a first LAN segment connected to a first port, wherein said first packet includes a first header that identifies a network source address corresponding to said first client and a network destination address corresponding to a second client on a second LAN segment connected to a second port;

interrupting a switch engine with a first triplet processor to transfer said first header to a packet buffer controller and a content-addressable memory while said first packet is still being received but after said first header is completely received by said first port;

associating in said content-addressable memory said network destination address with said second port;

assigning a first starting address in a circular packet buffer memory and transferring the whole of said first packet from said first port to said packet buffer memory as well as to said second port;

transmitting said first packet from said second port if said second port was not otherwise busy;

constructing a first triplet data structure comprising representations of said first port, said second port, and said first starting address and placing a copy of said first triplet data structure in front of said first packet in said packet buffer memory;

sending said first triplet data structure to a second triplet processor in said second port;

if said first packet had not already cut-through and had been sent, then fetching said first packet from said packet buffer memory with said second triplet processor and comparing said copy of said first triplet data structure in front of said first packet to said first triplet structure received by said second triplet processor in the previous step; and transmitting said first packet from said second port if said triplet data structures match and said first packet had not already been sent.

10. A method of communicating data packets between a plurality local area network (LAN) segments connected to a multi-port LAN device, the method comprising steps of:

receiving a packet into a first port from a segment of the LAN associated with the first port, the packet having a destination address;

looking-up the destination address in a table for identifying a second port for the packet;

loading the packet into a memory device; and determining whether the second port is available to receive the packet and, if the second port is available to receive the packet, performing a cut-through operation wherein the packet is received into the second port simultaneously with the step of loading the packet into the memory device, and if the second port is not available to receive the packet, performing a store-and-forward operation wherein the packet is received into the second port from the memory device after the second port is available to receive the packet.

11. The method according to claim 10 wherein a result of the step of looking up the destination address is a triplet wherein the triplet comprises a first field for identifying the first port, a second field for identifying the second port, and a third field for identifying a location assigned to the packet in the memory device.

12. A local area network (LAN) device, comprising:

a communication bus (24);

a look-up table (38) coupled to the communication bus (24);

a packet buffer (36) coupled to the communication bus (24);

a first port coupled to the communication bus (24), wherein the first port receives a header for a packet, the packet header having a source node address and a destination node address, wherein the first port initiates a look-up in the look-up table (38) after receiving the header for the packet and wherein the first port loads the packet into the packet buffer (36) after initiating the look-up; and a second port coupled to the communication bus (24) for transmitting the packet to a segment of the local area network associated with the second port, wherein the second port is identified by the look-up, and wherein if the second port is available to receive the packet, a cut-through is performed wherein the second port receives the packet directly from the first port via the communication bus (24) simultaneously with the loading of the packet into the packet buffer (36), and if the destination port does not receive the packet directly from the first port, a store-and-forward is performed wherein the destination port receives the packet from the packet buffer (36) after the second port is available to receive the packet.

13. The LAN device of claim 12 wherein a result of the look-up is a triplet (90) having a first field (92) for identifying the first port, a second field (94) for identifying the second port, and a third field (96) for identifying a location assigned to the packet in the packet buffer.

* * * * *

UNITED STATES PATENT AND TRADEMARK OFFICE
CERTIFICATE OF CORRECTION

PATENT NO. : 5,764,895

DATED : June 9, 1998

INVENTOR(S) : David H. Chung

It is certified that error appears in the above-identified patent and that said Letters Patent is hereby corrected as shown below:

On the title page:

U.S. Patent Document delete "4,723,211" and insert --4,723,311--.

U.S. Patent Document delete "4,849,961" and insert --4,849,962--.

In the Other Publications section, delete "Haw," and insert --Hawe,-- and delete "96 u." and insert --96u.--.

On page 2, U.S. Patent Documents for U.S. Patent No. 5,243,699, insert the class/subclass --395/275--.

In Column 6, line 58, delete "oort" and insert --port--.

In Column 7, lines 32-34, delete "SOURCE$_{13}$PORT$_{13}$STATUS, DESTINATION$_{13}$PORT$_{13}$STATUS, SWITCH$_{13}$ENGINE$_{13}$STATUS," and insert --SOURCE_PORT_STATUS, DESTINATION_ PORT_STATUS, SWITCH_ENGINE_STATUS,--.

In Column 7, lines 60-61 delete "roll$_{13}$call, get$_{13}$requests, bus$_{13}$grant, get$_{13}$interrupt$_{13}$id. get$_{13}$twelve$_{13}$bytes, and set$_{13}$triplet." and insert --roll_call, get_requests, bus_grant, get_interrupt_id, get_twelve_bytes and set_triplet.--

In Column 7, line 62, delete "roll$_{13}$call" and insert --roll_call--.

In Column 7, line 65, delete "get$_{13}$requests" and insert --get_requests--.

In Column 8, line 1, delete "bus$_{13}$grant" and insert --bus_grant--.

In Column 8, line 4, delete "ocher" and insert --other--.

In Column 8, line 12, delete "get$_{13}$interrupt$_{13}$id" and insert --get_interrupt_id--.

In Column 8, line 15, delete" get$_{13}$twelve$_{13}$byte" and insert --get_twelve_byte--.

In Column 8, line 18, delete "set$_{13}$triplet" and insert --set_triplet--.

In Column 9, line 47, delete "set$_{13}$triplet" and insert --set_triplet--.

UNITED STATES PATENT AND TRADEMARK OFFICE
CERTIFICATE OF CORRECTION

PATENT NO. : 5,764,895

DATED : June 9, 1998

INVENTOR(S) : David H. Chung

It is certified that error appears in the above-identified patent and that said Letters Patent is hereby corrected as shown below:

In Column 9, line 50, delete "$set_{13}triplet$" and insert --set_triplet--.
In Column 9, line 54, delete "$bus_{13}grant$" and insert --bus_grant--.
In Column 9, line 62, delete "oacket" and insert --packet--.
In Column 10, line 5, delete "$set_{13}triplet$" and insert --set_triplet--.
In Column 10, line 8, delete "$set_{13}triplet$" and insert --set_triplet--.
In Column 10, line 10, delete "$DESTINATION_{13}PORT_{13}STATUS$" and insert --DESTINATION_PORT_STATUS--.

Signed and Sealed this

First Day of September, 1998

BRUCE LEHMAN

*Attest:*

*Attesting Officer*           Commissioner of Patents and Trademarks